Aug. 16, 1960  J. J. SUNDAY  2,949,106
BOOSTER HEATERS FOR WATER CIRCULATING SYSTEMS
Filed June 9, 1958  3 Sheets-Sheet 1

INVENTOR.
James J. Sunday
BY
ATTORNEYS

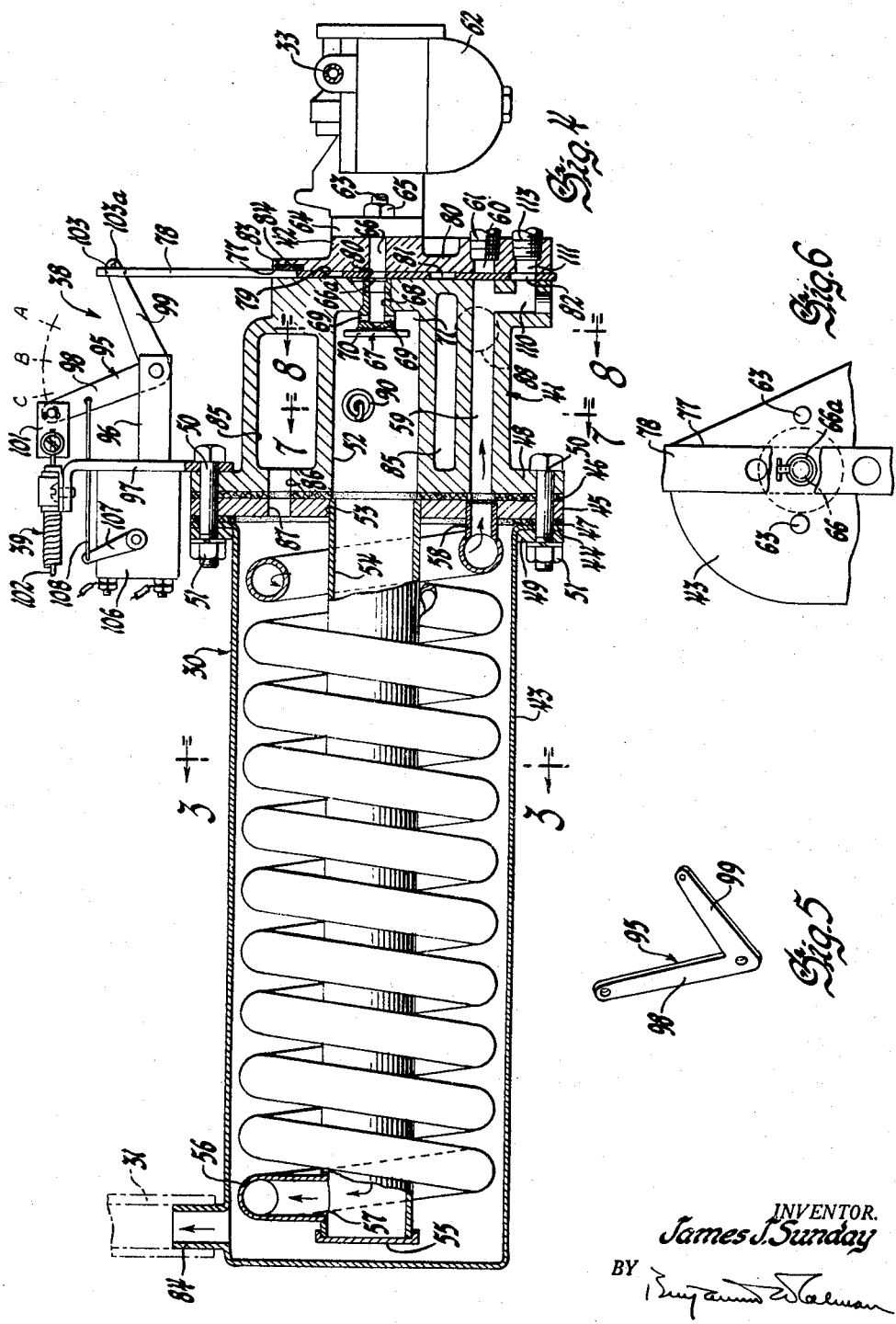

Aug. 16, 1960  J. J. SUNDAY  2,949,106
BOOSTER HEATERS FOR WATER CIRCULATING SYSTEMS
Filed June 9, 1958  3 Sheets-Sheet 3

INVENTOR.
James J. Sunday
BY
ATTORNEYS

United States Patent Office 2,949,106
Patented Aug. 16, 1960

2,949,106

BOOSTER HEATERS FOR WATER CIRCULATING SYSTEMS

James J. Sunday, Detroit, Mich., assignor to International Manufacturing Company, Hazel Park, Mich., a corporation of Michigan Filed June 9, 1958, Ser. No. 740,751

4 Claims. (Cl. 126—350)

This invention relates to heaters and particularly to booster heaters for the circulating systems of automobiles.

In present-day automobiles, water or a mixture of water and antifreeze is used in the circulating system in order to cool the engine. In cold climate when the engine is first started it takes considerable time to warm up the liquid in the circulating system. As a result, it is some time before the engine is operating at optimum efficiency. In addition, the heater for the interior of an automobile is usually connected to the circulating system and as a result considerable time passes before the heater is effective to heat the interior of the passenger compartment of the automobile.

It is therefore an object of this invention to provide a booster heater for the liquid circulating systems of automobiles and the like which will quickly and efficiently heat the liquid.

It is a further object of this invention to provide such a booster heater which will not adversely affect the operation of the engine.

It is a further object of this invention to provide such a booster heater which utilizes an electric spark or coil to start but which thereafter operates without the use of an electric spark or coil.

In the drawings:

Fig. 4 is a sectional view taken along the line 4—4 in Fig. 2.

Fig. 5 is a perspective view of an operating lever which is utilized in the booster heater.

Fig. 6 is a fragmentary end view of the booster heater, parts being broken away.

Figure 1:
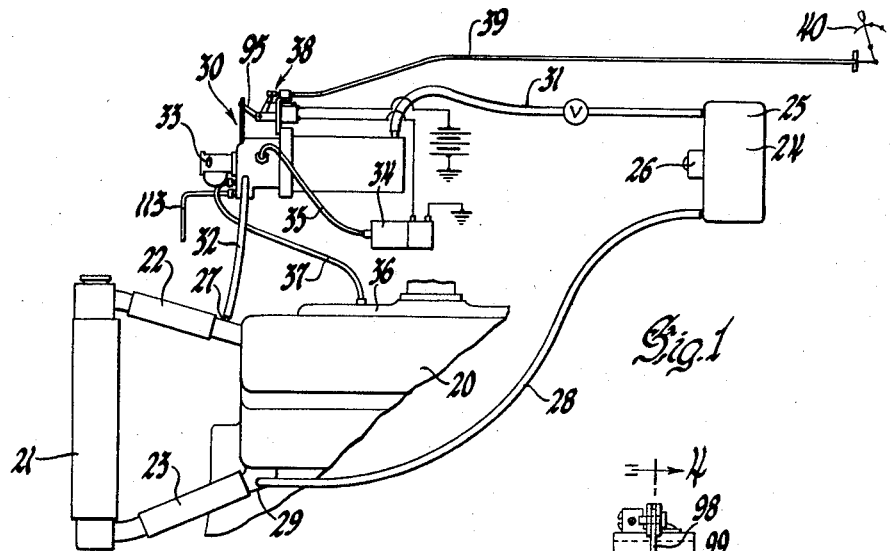
Fig. 1 is a diagrammatic view of the circulating system of an automobile including the booster heater embodying the invention.
Figure 2:
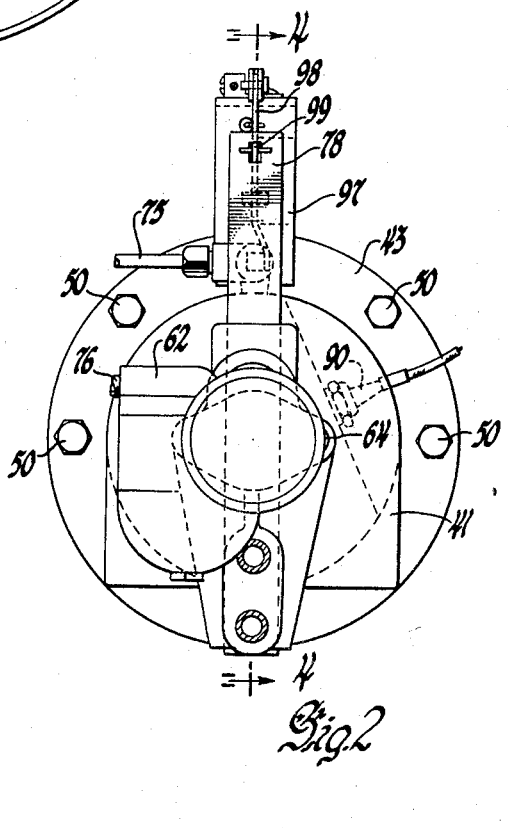
Fig. 2 is an end elevational view of the booster heater, on an enlarged scale.
Figure 3:
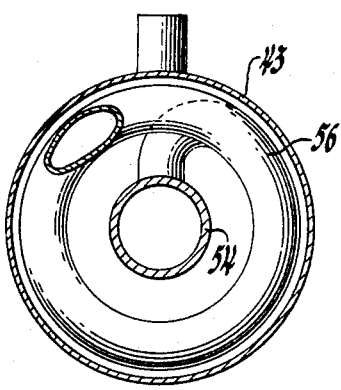
Fig. 3 is a sectional view taken along the line 3—3 in Fig. 4.

Referring to Fig. 1, there is shown an automobile engine having an engine block 20 connected to radiator 21 by conduits 22, 23 so that the liquid in block 20, which may comprise water or a mixture of water and antifreeze, circulates from block 20 through conduit 22 to radiator 21 and back through conduit 23 to block 20. Car heater 24, which is positioned within the passenger compartment of the automobile, comprises a radiator 25 through which liquid from the circulating system is circulated and a fan 26 which forces air from the passenger compartment over radiator 25 of heater 24 to heat the air. Car heater 24 is ordinarily connected to the circulating system of the automobile by a hose extending to point 27 on the upper part of the block or to conduit 22. A hose 28 extends from the lower end of radiator 25 of car heater 24 to a lower point on block 20 or conduit 23, as shown at 29. Liquid from the circulating system normally flows from point 27 to radiator 25 of car heater 24 and then returns through hose connection 28 to engine block 20.

As shown in Fig. 1, a booster heater 30 is connected between the upper part of radiator 25 of heater 24 and point 27 by hoses 31, 32. Booster heater 30 includes a connection 33 to the fuel pump of the automobile through which booster heater 30 receives fuel, namely, gasoline. Booster heater 30 is also connected to a spark-producing device 34 by wires 35, thereby providing electrical energy for initially igniting the fuel. Booster heater 30 is also connected to intake manifold 36 of the engine by a pipe 37 in order to cause the combustible gases to be pulled through the booster heater by the suction of the intake manifold, as presently described.

A control mechanism 38 is provided on booster heater 30 and includes a flexible cable 39 extending to a three-position lever 40 in the passenger compartment whereby the operation of the booster heater may be controlled.

As shown in Fig. 4, booster heater 30 comprises a casting 41 having a cover 42 at one end thereof and a cylindrical casing 43 extending from the other end thereof. Cylindrical casing 43 has one end thereof open and provided with a peripheral flange 44 adjacent casting 41. A plate 45 is positioned between casting 41 and casing 43 and gaskets 46, 47 are provided between flange 48 on casting 41 and plate 45 and between plate 45 and flange 44, respectively. An annular metal ring 49 is positioned adjacent flange 44. Casting 41, plate 45 and casing 43, including gaskets 46, 47 and annular ring 49, are maintained in assembled relationship by bolts 50 passing therethrough and having nuts 51 threaded thereon.

Figure 9:
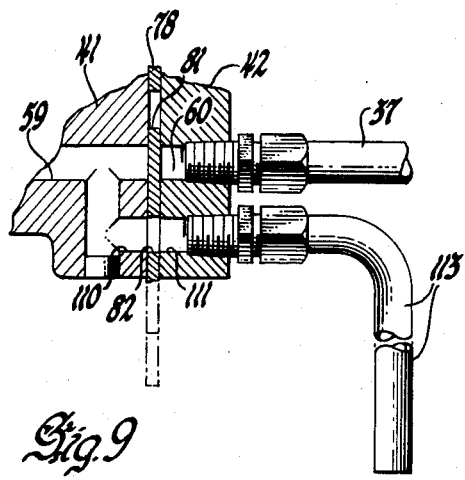
Fig. 9 is a fragmentary sectional view of a portion of the apparatus shown in Fig. 4, on an enlarged scale.

Casting 41 is provided with a centrally disposed cylindrical combustion chamber 52 which communicates with a centrally disposed circular opening 53 in plate 45. A tube 54 mounted in opening 53 extends axially into casing 43. The internal diameter of tube 54 is substantially the same as the internal diameter of chamber 52. A cap 55 closes the end of tube 54. A helical tube 56 surrounds tube 54 and has one end thereof in communication with the end of tube 54 adjacent cap 55 as at 57 and the other end thereof connected by a short conduit 58 mounted in plate 45 to a passageway 59 which passes through casting 41 and to a passageway 60 in cover 42. A fitting 61 connects opening 60 to tube 37 extending to the intake manifold of the engine (Fig. 1). Casting 41 is provided with a bypass 110 which is aligned with a passageway 111 in cap 42 (Figs. 4 and 9). The opening 111, in turn, communicates with the atmosphere through pipe 113.

A carburetor 62 receiving fuel from line 33 is mounted on cover 42. Cover 42 and carburetor 62 are mounted on casting 41 by means of studs 63 on casting 41 which extend through cover 42 and flanges 64 on carburetor 62. Nuts 65 are threaded on studs 63. The outlet of carburetor 62 communicates with a cylindrical passageway 66 in cover 42 which is aligned with the axis of combustion chamber 52. A reed valve 66a is positioned between passageway 66 and combustion chamber 52 in such a manner that it opens when the pressure in combustion chamber 52 is decreased and closes when the pressure in combustion chamber 52 is increased.

Casting 41 has a plug 67 mounted in the end thereof adjacent carburetor 62. Plug 67 includes a longitudinally extending passageway 68 which is aligned with passageway 66 in plate 42 and ports 69 extending transversely or radially from passageway 68. Plug 67 is also provided with a deflector flange 70 which extends radially beyond the outer ends of ports 69. A mixture of fuel and air from carburetor 62 passes to combustion chamber 52 if passageway 66 in cover 42 and passageway 68 in plug 67 are permitted to communicate. Fuel is supplied to carburetor 62 from line 33. As described above, line 33 communicates with the fuel pump of the automobile engine.

As shown in Figs. 4 and 6, cover 42 is provided with a transverse channel 77 in which a slide 78 is reciprocable. Slide 78 is provided with spaced openings 79, 80, 81 and 82. In the position shown in Fig. 4, opening 80 is in alignment with passageway 66, thereby providing communication between passageway 66 and combustion chamber 52. Opening 82 is in alignment with bypass 110 and opening 111, thereby providing communication between passageway 59 and the atmosphere. The spacing of openings 79, 80, 81, 82 is such that, in another position of slide 78, opening 79 is in alignment with passageway 66 while opening 81 is in alignment with passageway 60 in cover 42; the openings 80 and 82 being out of register with any of the passageways. In a further position of slide 78, opening 81 is in alignment with passageway 111 while openings 79, 80 and 82 are out of alignment with any of the passageways in the cover. By this arrangement, slide 78 is used to control the operation of the booster heater as more fully describel below. Slide 78 is yieldingly maintained in the position to which it is adjusted by a spring 83 positioned in cover 42 and compressed between slide 78 and a portion 84 of cover 42.

Figure 7:
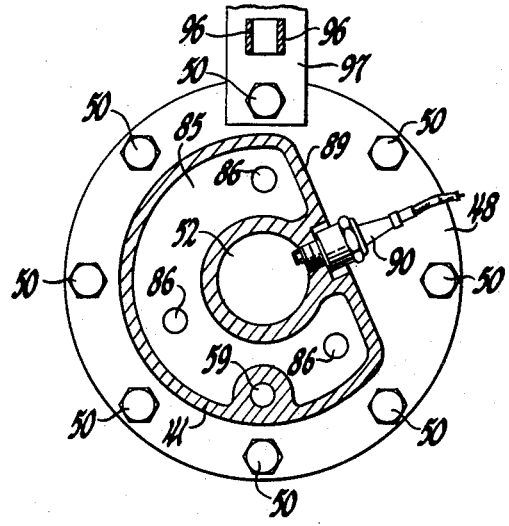
Fig. 7 is a sectional view taken along the line 7—7 in Fig. 4.
Figure 8:
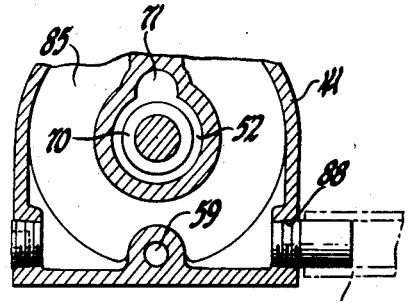
Fig. 8 is a sectional view taken along the line 8—8 in Fig. 4.

Referring to Figs. 4, 7 and 8, casting 41 includes a generally annular liquid chamber 85 surrounding combustion chamber 52. Chamber 85 communicates with the interior of casing 43 through a plurality of aligned openings 86, 87 in casting 41 and plate 45, respectively (Fig. 4). Chamber 85 also communicates with a liquid inlet which comprises a transverse opening 88 in the wall of casting 41 (Fig. 8). Liquid from the circulating system of the automobile passes through inlet 88 from hose 32. Casing 43 is provided with an outlet 84 adjacent its closed end (Fig. 4) to which hose 31 is connected.

As shown in Fig. 7, a portion of the annular chamber 85 has a depressed wall 89 in which a spark plug 90 is mounted with the ignition or spark portion thereof extending into combustion chamber 52. Periodic sparks are provided to plug 90 by mechanism 34 which is driven by the generator or some other rotatable part of the engine.

The control for the booster heater including slide 78 includes a control lever 95 pivotally mounted between parallel arms 96 of a bracket 97 which, in turn, is mounted on the heater by means of one of the bolts 50.

Lever 95 includes two angularly spaced legs 98, 99 (Fig. 5) extending radially from the pivot point of lever 95. Leg 98 is connected to plates 101 to which the end of wire 102 of operating cable 39 is fastened. When cable 39 is actuated from the passenger compartment, wire 102 moves lever 95 through leg 98 to one of several positions A, B, C (Fig. 4). Leg 99 extends through a slot 103 in the upper end of slide 78 so that, as lever 95 is moved to different positions, slide 78 is caused to move vertically in groove 77 in the cover (Fig. 4). A pin 103a extends transversely through the end of leg 99 to insure that the end of leg 99 remains in slot 103.

A switch 106 mounted on bracket 97 controls the passage of the spark to spark plug 90 and has three positions, namely, off, on, off. The switch is controlled by an arm 107 pivoted thereto and connected by a wire link 108 to leg 98 of lever 95. By this arrangement, when control lever 95 is in positions A or C, the switch is off. When control lever 95 is in position B the switch is on.

Referring to Fig. 1, the booster heater 30 is normally mounted with the axis of casing 43 in generally horizontal position and liquid outlet 84 of casing 43 extending upwardly. When the connections are made to the booster heater mounted in this position, liquid from the engine-circulating system enters inlet 88 through hose 32, is circulated through chamber 85 in casting 41 and passes through the pairs of aligned openings 86, 87 into casing 43. The liquid then flows around tube 54 and helical coil 56 and outlet 84 and through hose 31 to radiator 25 of car heater 24. This circulation of liquid occurs at all times.

When the booster heater is not operating, manual control 40 within the passenger compartment is in the forward position relative to the driver (Fig. 1) so that the lever 95 is in position A (Fig. 4). In position A switch 106, which controls the spark to plug 90, is off; leg 99 holds slide 78 in such a position that there is no communication between passageway 66 and opening 68 in plug 67; and opening 81 is aligned with bypass 110 and passageway 111 to provide communication between the atmosphere and passageway 59 in casting 41.

To start the booster heater, with the engine running, manual lever 40 is pulled back so that wire 102 moves lever 95 to position B. In position B wire link 108 holds arm 107 of switch 106 in position where the switch is on or energized; leg 99 holds slide 78 in position where opening 79 in slide 78 provides communication between opening 66 and passageway 68 and opening 81 in slide 78 provides communication between opening 60 and passageway 59.

With the parts in this position, the operation of the engine produces a partial vacuum in the intake manifold causing the mixture of fuel and air from carburetor 62 to be drawn through opening 66 and passageway 68 out of ports 69 into chamber 52. Spark plug 90 ignites the mixture of fuel and air and the ignited mixture is drawn through tube 54 and passes into helical coil 56 at 57 and from helical coil 56 to point 58 into passageway 59 through opening 60 and fitting 61 to line 37 which extends to the manifold. The ignited mixture passing through tube 54 and helical coil 56 causes heat to be transmitted to the liquid which surrounds tube 54 and helical coil 56 in casing 43.

The entrance of fuel and air to combustion chamber 52 is restricted by a reed valve 66a which will only permit the entry of air when the pressure in combustion chamber 52 is below atmospheric. Reed valve 66a operates as a safety device to prevent the backfire of combustible gases through ports 69. Whenever the pressure in combustion chamber 52 becomes greater than that in the carburetor, reed valve 66a is closed.

After the burner is operated for a short period of time and the parts, specifically combustion chamber 52, have been warmed up, cable 39 is actuated to pivot control lever 95 to position C, as shown in Fig. 4. In position C wire link 108 holds arm 107 of switch 106 in position where the switch is off or deenergized; leg 99 holds slide 78 in position where opening 80 in slide 78 is in alignment with opening 66 and passageway 68, and opening 82 in slide 78 provides communication between passageway 59 and the atmosphere. Since the parts have been warmed by previous operation, the mixture of fuel and air ignites without the need for a spark from plug 90. The mixture of fuel and air continues to ignite and burn, passing through tube 54 and helical coil 56 and thereby heating the water surrounding the tube and coil in the same manner as when the control lever 95 is in position B.

Thus, in this position, the combustible gases resulting from combustion of the fuel are passed directly to the atmosphere rather than to the intake manifold. By this arrangement, any tendency for the operation of the booster heater to affect the manifold pressure and thereby affect the operation and the efficiency of the engine is entirely eliminated after the initial interval (in position B) during which the heater is brought to operating temperature.

After a short time of operation, the liquid in the circulating system of the automobile will be sufficiently heated so that the booster heater may be turned off. This is accomplished by moving control wire 102 of cable 39 to pivot control lever 95 to position A. In position A each of openings 79, 80 and 81 in slide 78 is out of alignment with its respective passageway while opening 82 is in alignment with its passageway. In addition, switch 106 is in off position so that there is no spark supplied to plug 90.

I claim:
1. In a heater for heating the liquid in a circulating system, the combination comprising a head having a combustion chamber, means for supplying a mixture of fuel and air to said chamber, ignition means in said chamber for igniting the mixture of fuel and air, means for controlling the flow of fuel and air from said fuel and air supplying means to said combustion chamber, means in said head defining a liquid cavity surrounding said combustion chamber, said liquid cavity having an inlet and an outlet, means positioned adjacent said head and defining a liquid chamber communicating with the outlet of said cavity in said head, said liquid chamber being provided with an outlet, means for directing the gases of combustion from said combustion chamber in said head in a closed path through said liquid chamber, vacuum means connected to said latter means for producing a partial vacuum to induce the flow of combustion gases from said combustion chamber to said vacuum means, means in said head defining a bypass for bypassing the combustion gases away from said vacuum-producing means to the atmosphere, and means for controlling said latter means whereby the combustion gases may be selectively and alternatively directed to the vacuum-producing means and to the atmosphere, means for controlling said ignition means, and means interconnecting said means for controlling said ignition means and said means for controlling said bypass-defining means whereby said ignition means is energized when the combustion gases are being directed to the vacuum-producing means and are deenergized when said combustion gases are being directed to the atmosphere.

2. In a heater for heating the liquid in a circulating system, the combination comprising a head having a combustion chamber, means for supplying a mixture of fuel and air to said head, a first passageway in said head extending between said combustion chamber and said fuel and air supplying means, a slide member mounted for reciprocating movement in said head, said slide member having a first opening and a second opening which may selectively be brought into alignment with said first passageway, thereby permitting the flow of fuel and air from said fuel and air supplying means to said combustion chamber, said head including a liquid cavity surrounding said combustion chamber, said liquid cavity having an inlet and an outlet, means positioned adjacent said head and defining a liquid chamber communicating with the outlet of said cavity in said head, said liquid chamber being provided with an outlet, means for directing the gases of combustion from said combustion chamber in said head through said liquid chamber, a second passageway in said head connected to said latter means, vecuum means connected to said second passageway for producing a partial vacuum to induce the flow of combustion gases from said combustion chamber to said vacuum means, a third passageway in said head connected to said means for directing the gases of combustion and communicating with the atmosphere, said slide member having a third opening which may be selectively brought into alignment with the second and third passageways in said head, and having a fourth opening which may be selectively brought into alignment with the third passageway in said head, said openings in said slide member being arranged in such a manner that when said first and second openings are out of alignment with the first passageway thereby preventing communication between said combustion chamber and said fuel and air supplying means, said third opening in said slide member is in alignment with said third passageway, thereby providing communication between said combustion gas-directing means and the atmosphere and said third opening is out of alignment with said second passageway, thereby preventing communication between said combustion gas-directing means and said vacuum-producing means, and when said slide member is in position such that said first opening is in alignment with said first passageway thereby providing communication between said combustion chamber and said fuel and air supplying means, said second opening is out of alignment with said first passageway, said third opening is in alignment with said second passageway thereby providing communication between said combustion gas-directing means and said vacuum-producing means, and said fourth opening is out of alignment with the third passageway thereby preventing communication between said combustion gas-directing means and the atmosphere, and when said second opening is in alignment with the first passageway thereby providing communication between said combustion chamber and said fuel and air supplying means, said first opening is out of alignment with said first passageway, said third opening is out of alignment with said second and third passageways and said fourth opening is in alignment with said third passageway thereby providing communication between said combustion gas-directing means and the atmosphere.

3. The combination set forth in claim 2 including means for energizing and deenergizing said ignition means, said means being operable by the movement of said slide member in such a manner that said ignition means is deenergized when said first opening in said slide member is out of alignment with the first passageway and said ignition means is energized when said first opening is in alignment with said first passageway.

4. The combination set forth in claim 3 including means for actuating said slide member comprising a control lever pivotally mounted adjacent said head, said control lever having a plurality of angularly extending legs, one of said legs being connected to said slide member, said means for energizing and deenergizing said ignition means comprising a switch mounted adjacent said head, another leg of said control lever being operatively connected to said switch whereby movement of said control lever reciprocates said slide member and actuates said switch.

References Cited in the file of this patent
UNITED STATES PATENTS

| | | |
|---|---|---|
| 1,357,598 | Thompson | Nov. 2, 1920 |
| 1,427,059 | Bridgford et al. | Aug. 22, 1922 |
| 1,923,641 | Clarkson | Aug. 22, 1933 |
| 2,285,672 | McCollum | June 9, 1942 |
| 2,308,888 | McCollum | Jan. 19, 1943 |
| 2,332,094 | McCollum | Oct. 19, 1943 |
| 2,348,767 | Walker et al. | May 16, 1944 |
| 2,385,854 | Wolfersperger | Oct. 2, 1945 |
| 2,551,823 | Buttner | May 8, 1951 |
| 2,617,399 | Backus | Nov. 11, 1952 |
| 2,681,052 | Kazial | June 15, 1954 |